United States Patent
Geling et al.

(10) Patent No.: US 10,209,470 B2
(45) Date of Patent: Feb. 19, 2019

(54) TELECOMMUNICATIONS TRAY WITH A CABLE ROUTING PATH EXTENDING THROUGH A PIVOT HINGE

(71) Applicant: CommScope Connectivity Belgium BVBA, Kessel-Lo (BE)

(72) Inventors: Bernardus Johannes Nicolas Geling, Genk (BE); Gwenole Stouthuysen, Glabbeek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/512,028

(22) PCT Filed: Sep. 16, 2015

(86) PCT No.: PCT/EP2015/071228
§ 371 (c)(1),
(2) Date: Mar. 16, 2017

(87) PCT Pub. No.: WO2016/042032
PCT Pub. Date: Mar. 24, 2016

(65) Prior Publication Data
US 2017/0276892 A1  Sep. 28, 2017

Related U.S. Application Data

(60) Provisional application No. 62/051,106, filed on Sep. 16, 2014.

(51) Int. Cl.
*G02B 6/44* (2006.01)

(52) U.S. Cl.
CPC ......... *G02B 6/4452* (2013.01); *G02B 6/4455* (2013.01)

(58) Field of Classification Search
CPC ....... G02B 6/4452; G02B 6/4455; G02B 6/44
See application file for complete search history.

(56) References Cited

U.S. PATENT DOCUMENTS

| 4,708,430 A | 11/1987 | Donaldson et al. |
| 4,792,203 A | 12/1988 | Nelson et al. |

(Continued)

FOREIGN PATENT DOCUMENTS

| DE | 43 29 184 A1 | 3/1995 |
| DE | 44 13 136 C1 | 5/1995 |

(Continued)

OTHER PUBLICATIONS

International Search Report and Written Opinion of the International Searching Authority for International Patent Application No. PCT/EP2015/071228 dated Nov. 18, 2015, 10 pgs.

(Continued)

*Primary Examiner* — Andrew Jordan
(74) *Attorney, Agent, or Firm* — Merchant & Gould P.C.

(57) ABSTRACT

A multi-positionable tray assembly (20) for mounting within a chassis (10) of a telecommunications panel (100) is disclosed. The multi-positionable tray assembly (20) may include support arm (24) that pivotally supports a tray (22) and that allows the tray assembly (20) to be installed and removed from the chassis (10). The tray (22) and the support arm (24) cooperatively define a cable routing pathway (208) that extends through a pivot axis (A1) defined by the tray and the support arm. To minimize the required depth of the tray (10) and optimize cable routing, the tray (20) can include a cable management structure (102) with a patch panel (104) having a plurality of adapters (108) arranged along a transverse axis (A2), wherein the transverse axis is non-parallel or oblique to a front plane (A4) of the tray.

11 Claims, 18 Drawing Sheets

(56) References Cited

U.S. PATENT DOCUMENTS

| | | |
|---|---|---|
| 4,912,615 A | 3/1990 | Bluband |
| 4,995,681 A | 2/1991 | Parnell |
| 5,142,606 A | 8/1992 | Carney et al. |
| 5,266,272 A | 11/1993 | Griner et al. |
| 5,339,379 A | 8/1994 | Kutsch et al. |
| 5,402,515 A | 3/1995 | Vidacovich et al. |
| 5,497,444 A | 3/1996 | Wheeler |
| 5,584,396 A | 12/1996 | Schmitt |
| 5,717,810 A | 2/1998 | Wheeler |
| 5,730,400 A | 3/1998 | Rinderer et al. |
| 5,740,299 A | 4/1998 | Llewellyn et al. |
| 5,758,003 A | 5/1998 | Wheeler et al. |
| 5,778,131 A | 7/1998 | Llewellyn et al. |
| 5,870,519 A | 2/1999 | Jenkins et al. |
| 5,946,440 A | 8/1999 | Puetz |
| 5,966,492 A | 10/1999 | Bechamps et al. |
| 6,160,946 A | 12/2000 | Thompson et al. |
| 6,234,240 B1 | 5/2001 | Cheon |
| 6,263,141 B1 | 7/2001 | Smith |
| 6,272,009 B1 | 8/2001 | Buican et al. |
| 6,301,424 B1 | 10/2001 | Hwang |
| 6,418,264 B1 | 7/2002 | Hough et al. |
| 6,427,045 B1 | 7/2002 | Matthes et al. |
| 6,438,310 B1 | 8/2002 | Lance et al. |
| 6,442,022 B1 | 8/2002 | Paul |
| 6,529,373 B1 | 3/2003 | Liao et al. |
| 6,538,879 B1 | 3/2003 | Jiang |
| 6,540,083 B2 | 4/2003 | Shih |
| 6,556,763 B1 | 4/2003 | Puetz et al. |
| 6,560,099 B1 | 5/2003 | Chang |
| 6,591,051 B2 | 7/2003 | Solheid et al. |
| 6,600,665 B2 | 7/2003 | Lauchner |
| 6,631,237 B2 | 10/2003 | Knudsen et al. |
| RE38,311 E | 11/2003 | Wheeler |
| 6,738,261 B2 | 5/2004 | Vier et al. |
| 6,760,531 B1 | 7/2004 | Solheid et al. |
| 6,788,544 B1 | 9/2004 | Barsun et al. |
| 6,788,786 B1 | 9/2004 | Kessler et al. |
| 6,810,194 B2 * | 10/2004 | Griffiths ............... G02B 6/4454 |
| | | 385/135 |
| 6,850,685 B2 * | 2/2005 | Tinucci ............... G02B 6/4455 |
| | | 385/134 |
| 6,870,734 B2 | 3/2005 | Mertesdorf et al. |
| 6,902,069 B2 | 6/2005 | Hartman et al. |
| 6,925,241 B2 | 8/2005 | Bohle et al. |
| 6,944,383 B1 | 9/2005 | Herzog et al. |
| 6,944,387 B2 | 9/2005 | Howell et al. |
| 7,079,744 B2 | 7/2006 | Douglas et al. |
| 7,086,539 B2 | 8/2006 | Knudsen et al. |
| 7,090,084 B2 | 8/2006 | Knudsen et al. |
| 7,102,884 B2 | 9/2006 | Mertesdorf et al. |
| 7,142,765 B2 | 11/2006 | Rapp et al. |
| 7,302,154 B2 * | 11/2007 | Trebesch ............... G02B 6/4452 |
| | | 385/135 |
| 7,349,615 B2 | 3/2008 | Frazier et al. |
| 7,408,769 B2 | 8/2008 | Mertesdorf et al. |
| 7,460,758 B2 | 12/2008 | Xin |
| 7,478,730 B2 | 1/2009 | Knudsen et al. |
| 7,527,226 B2 | 5/2009 | Kusuda et al. |
| 7,856,166 B2 * | 12/2010 | Biribuze ............... G02B 6/4452 |
| | | 385/134 |
| 8,002,123 B2 | 8/2011 | Knudsen et al. |
| 8,019,191 B2 * | 9/2011 | Laurisch ............... G02B 6/4455 |
| | | 385/134 |
| 8,144,457 B2 | 3/2012 | Mertesdorf et al. |
| 8,315,498 B2 | 11/2012 | Redmann et al. |
| 8,331,752 B2 * | 12/2012 | Biribuze ............... G02B 6/4452 |
| | | 385/135 |
| 8,417,074 B2 | 4/2013 | Nhep et al. |
| 8,879,881 B2 | 11/2014 | Cote et al. |
| 8,991,623 B2 | 3/2015 | Knudsen et al. |
| 9,081,164 B2 | 7/2015 | Badar et al. |
| 9,128,262 B2 * | 9/2015 | Campbell ............... G02B 6/4452 |
| 9,494,759 B2 * | 11/2016 | Claessens ............... G02B 6/4453 |
| 9,529,171 B2 | 12/2016 | Knudsen et al. |
| 9,664,870 B2 * | 5/2017 | Trebesch ............... G02B 6/4455 |
| 9,715,075 B2 * | 7/2017 | Solheid ............... G02B 6/4455 |
| 9,823,432 B2 | 11/2017 | Alexi et al. |
| 10,025,055 B2 * | 7/2018 | Alexi ............... G02B 6/44 |
| 2002/0125800 A1 | 9/2002 | Knudsen et al. |
| 2002/0159745 A1 | 10/2002 | Howell et al. |
| 2002/0179485 A1 | 12/2002 | Shih |
| 2002/0191942 A1 | 12/2002 | Griffiths et al. |
| 2003/0086675 A1 | 5/2003 | Wu et al. |
| 2004/0074852 A1 | 4/2004 | Knudsen et al. |
| 2004/0079711 A1 | 4/2004 | Hartman et al. |
| 2004/0251220 A1 | 12/2004 | Mertesdorf et al. |
| 2006/0118497 A1 | 6/2006 | Knudsen et al. |
| 2006/0275008 A1 | 12/2006 | Xin |
| 2007/0127201 A1 | 6/2007 | Mertesdorf et al. |
| 2007/0230889 A1 | 10/2007 | Sato et al. |
| 2008/0152416 A1 | 7/2008 | Heaton et al. |
| 2009/0129045 A1 | 5/2009 | Mertesdorf et al. |
| 2009/0257726 A1 | 10/2009 | Redmann et al. |
| 2009/0270832 A1 * | 10/2009 | Vancaillie ............... A61J 1/1475 |
| | | 604/408 |
| 2010/0012599 A1 | 1/2010 | Knudsen et al. |
| 2010/0054681 A1 * | 3/2010 | Biribuze ............... G02B 6/4452 |
| | | 385/135 |
| 2011/0085776 A1 * | 4/2011 | Biribuze ............... G02B 6/4452 |
| | | 385/135 |
| 2011/0297629 A1 | 12/2011 | Knudsen et al. |
| 2013/0170810 A1 | 7/2013 | Badar et al. |
| 2013/0322839 A1 * | 12/2013 | Claessens ............... G02B 6/4455 |
| | | 385/135 |
| 2014/0248028 A1 | 9/2014 | Campbell et al. |
| 2014/0376870 A1 | 12/2014 | Takeuchi et al. |
| 2015/0234142 A1 | 8/2015 | Courchaine et al. |
| 2016/0124160 A1 * | 5/2016 | Verheyden ............... G02B 6/3809 |
| | | 385/56 |
| 2017/0227728 A1 * | 8/2017 | Claessens ............... G02B 6/4455 |
| 2017/0235077 A1 | 8/2017 | Knudsen et al. |
| 2017/0276893 A1 * | 9/2017 | Geling ............... G02B 6/4452 |
| 2017/0293099 A1 * | 10/2017 | Alexi ............... G02B 6/4455 |
| 2018/0231730 A1 * | 8/2018 | Geens ............... G02B 6/4452 |

FOREIGN PATENT DOCUMENTS

| | | |
|---|---|---|
| EP | 0 215 668 A2 | 3/1987 |
| EP | 0 293 183 A2 | 11/1988 |
| EP | 0 594 913 A1 | 5/1994 |
| EP | 1 203 974 A2 | 5/2002 |
| EP | 2 159 617 A2 | 3/2010 |
| EP | 2 772 780 A1 | 9/2014 |
| EP | 2 775 334 A1 | 9/2014 |
| FR | 2 959 383 A1 | 10/2011 |
| WO | WO 02/19005 A2 | 3/2002 |
| WO | WO 02/21182 A1 | 3/2002 |
| WO | WO 02/071767 A2 | 9/2002 |
| WO | WO 2008/149131 A2 | 12/2008 |
| WO | WO 2011/100613 A1 | 8/2011 |

OTHER PUBLICATIONS

ADC Telecommunications, Inc., FL2000 Products Catalog, Literature No. 803, front cover, table of contents, pp. 1-32, rear cover (Dec. 2000).

ADC Telecommunications, Inc., Next Generation Frame Product Family Ordering Guide, Literature No. 820, front cover, table of contents, pp. 1-43, rear cover (Apr. 2002).

* cited by examiner

TELECOMMUNICATIONS TRAY WITH A CABLE ROUTING PATH EXTENDING THROUGH A PIVOT HINGE

CROSS-REFERENCE TO RELATED APPLICATION

This application is a National Stage Application of PCT/EP2015/071228, filed on Sep. 16, 2015, which claims benefit of U.S. Patent Application Ser. No. 62/051,106 filed on Sep. 16, 2014, which applications are incorporated herein by reference. To the extent appropriate, a claim of priority is made to each of the above disclosed applications.

FIELD OF THE INVENTION

The present invention relates to telecommunications panels and cable bend control guides, patch cord supports, and hinges adapted to be used in various telecommunications panels.

BACKGROUND

Numerous telecommunications panels exist today and are used in various equipment applications. Conventional telecommunications panels include hinges that are designed to allow a tray to be rotated out of the telecommunications panel. By rotating the tray out of the telecommunications panel, access is provided to rear portions of a termination field. Such trays may include cable management structures that aid in organizing and managing telecommunications cables routed to and away from the telecommunications panel.

SUMMARY

Aspects of the disclosure are directed to a multi-positionable tray assembly for mounting within a chassis of a telecommunications panel. In one aspect, the multi-positionable tray assembly includes a tray and a support arm. The tray is configured to support at least one cable management structure while the support arm is connected to and supports the tray at a pivot joint. This structure allows the tray to be rotatable about the pivot joint at a pivot axis between a folded position and an access position. In one aspect, the support arm is configured for removable attachment to the chassis such that the multi-positionable tray assembly can be placed in a removed position away from the chassis and an installed position within the chassis.

In one aspect, the tray and the support arm cooperatively define a cable routing pathway that extends through the pivot axis of the pivot joint defined by the tray and the support arm. In contrast to pivoting trays relying upon a structural element extending along the pivot axis, the disclosed configuration has an open configuration that allows for cabling to be routed through the pivot axis without having to be routed around a structural element.

In yet another aspect, the cable management structure in the tray includes a patch panel having a plurality of adapters arranged along a transverse axis, wherein each of the adapters has a longitudinal connection axis. In one configuration, some of the adapters are positioned with their longitudinal connection axes disposed at an oblique angle relative to the transverse axis. In one configuration, the patch panel transverse axis is non-parallel or oblique to the front face and rear side of the tray. By placing the adapters at an angle relative to the tray and the transverse axis, less depth is required of the tray to accommodate cabled fiber optic connecters that are connected on either or both sides of the adapters. By placing the patch panel transverse axis at an angle with respect to the front face of the tray, the areas within the tray that have the largest accumulated bundles of patch cords are increased in size to better accommodate the cords.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Whenever possible, the same reference numbers will be used throughout the drawings to refer to the same or similar parts.

Figure 1:
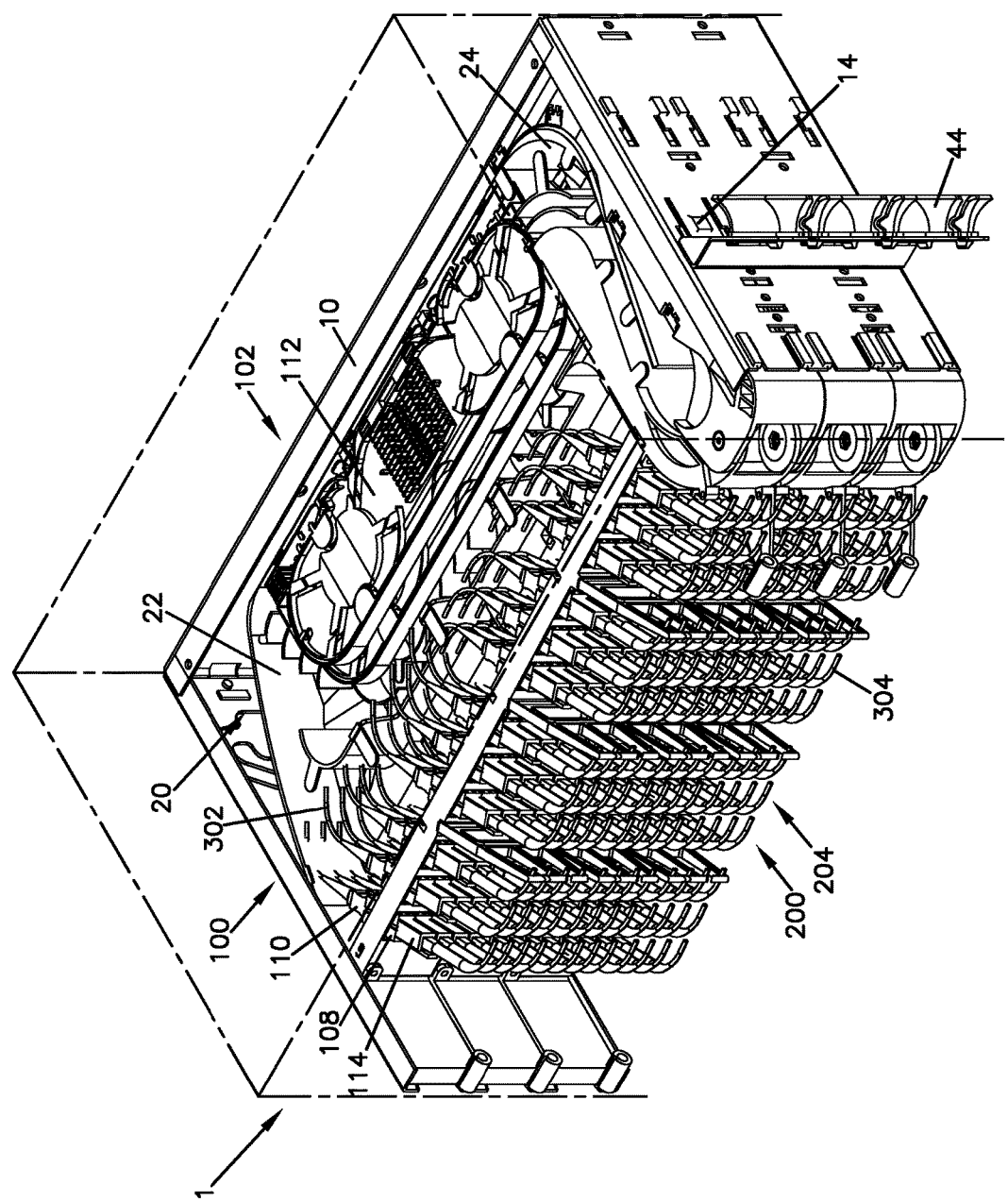
FIG. 1 is a perspective view of an example telecommunications panel including a plurality of multi-positionable tray assembly in accordance with principles of the present disclosure.
Figure 2:
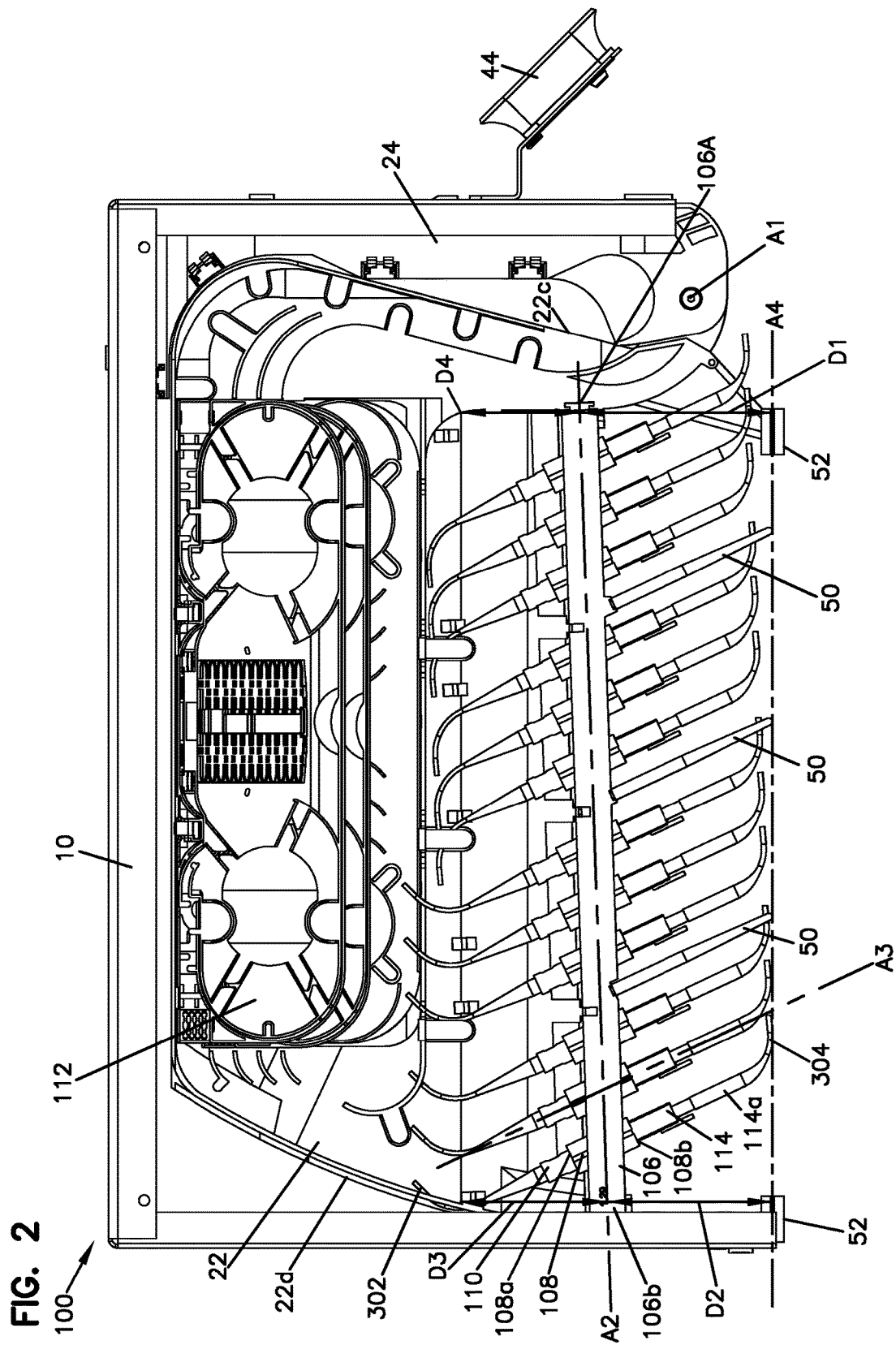
FIG. 2 is a top view of the telecommunications panel of FIG. 1.
Figure 3:
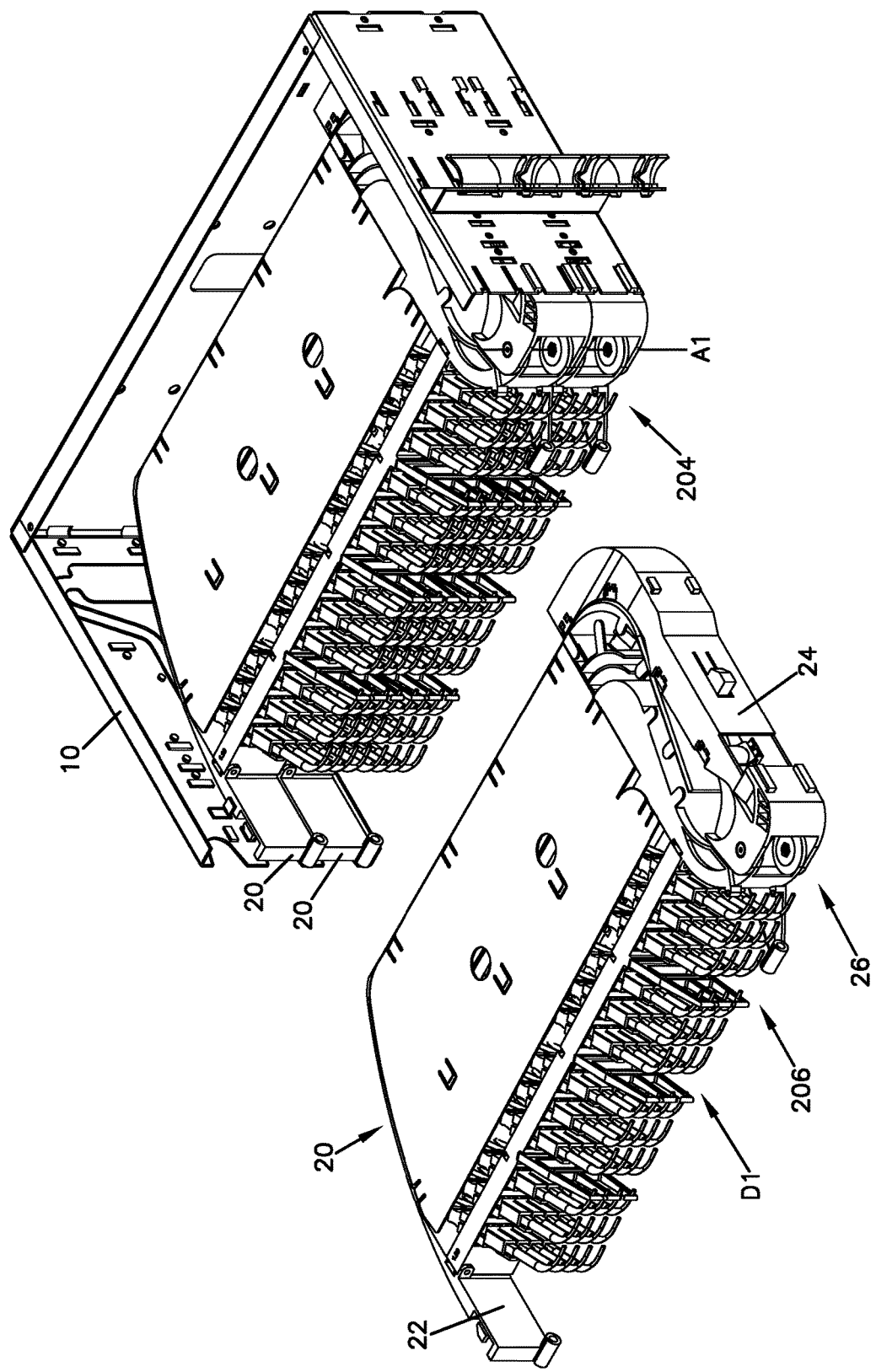
FIG. 3 is a perspective view of the telecommunications panel of FIG. 1, with one of the multi-positionable tray assemblies in a removed position.

Referring now to FIGS. 1 and 2, a telecommunications panel 100 (e.g., an enclosure, an optical distribution frame, etc.) is illustrated according to the principles of the present disclosure. As further illustrated at FIG. 1, the telecommunications panel 100 may be included in a cabinet 200. The telecommunications panel 100 and/or the cabinet 200 may be used for various purposes in telecommunications systems. For example, housing a cable management structure 102 including, for example, stacked splice trays 112 and a patch panel 104. In one aspect, patch cords 302, 304 (i.e., patch cables, connectorized fiber optic cables, etc.) may enter the telecommunications panel 100 and/or the cabinet 200 and be interconnected at a patch panel 104. The patch panel 104 may include a plurality of fiber optic adapters 108. Fiber optic connectors 110, 114 that terminate ends of the patch cords 302, 304 may connect with the fiber optic adapters 108 of the patch panel 104. The interconnections at the patch panel 104 may be rearranged from time-to-time, as desired, for changing configurations of the telecommunications system. The telecommunications panel 100 may further hold splitters, filters, and various other telecommunications components.

The telecommunications panel 100 may include a chassis 10 to which a plurality of stacked multi-positionable tray assemblies 20 may be removably attached. In one aspect, the multi-positionable tray assembly 20 includes a tray 22 (e.g., a sub-rack) and a support arm 24 that are pivotally connected to each other via a pivot joint 26 that allows the tray assembly 20 to be moved between a folded position 200 and an access position 202. The pivot joint 26 is formed by the interface between an upper joint arm 28 of the support arm 24 and an upper joint extension 32 of the tray 22 and by the interface between a lower joint arm 30 of the support arm 24 and a lower joint extension 34 of the tray 22. The interfaces can be secured together by a variety of means, for example, a snap-fit type connection via protrusions and corresponding recesses or by a connection utilizing fasteners. As depicted, the pivot joint 26 represents the connection between the tray 22 and the support arm 24 to the chassis 10 and defines a vertical hinge with an axis A1 for the multi-positionable tray assembly 20.

Figure 4:
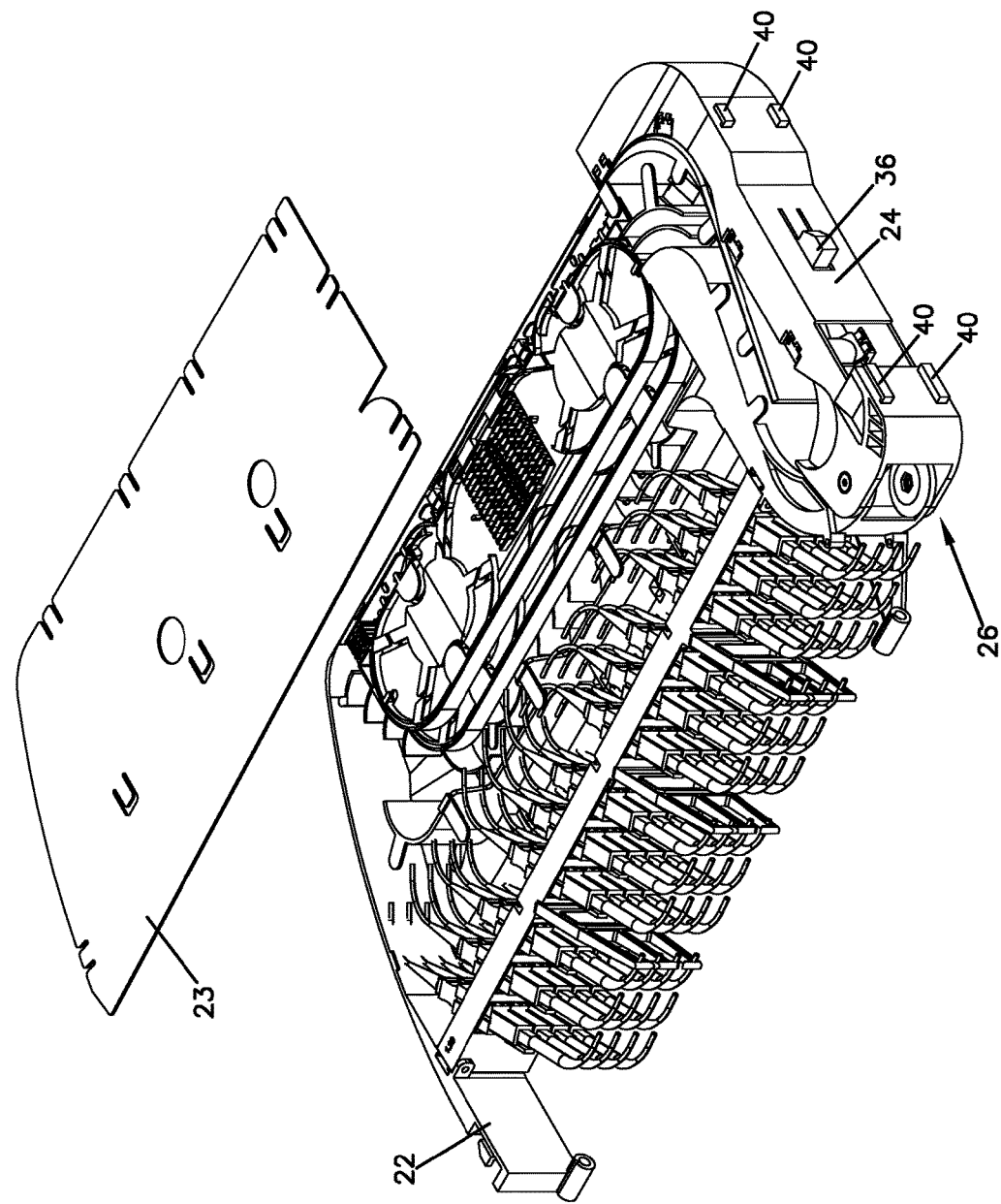
FIG. 4 is a perspective view of the chassis of the telecommunications panel of FIG. 1.
Figure 5:
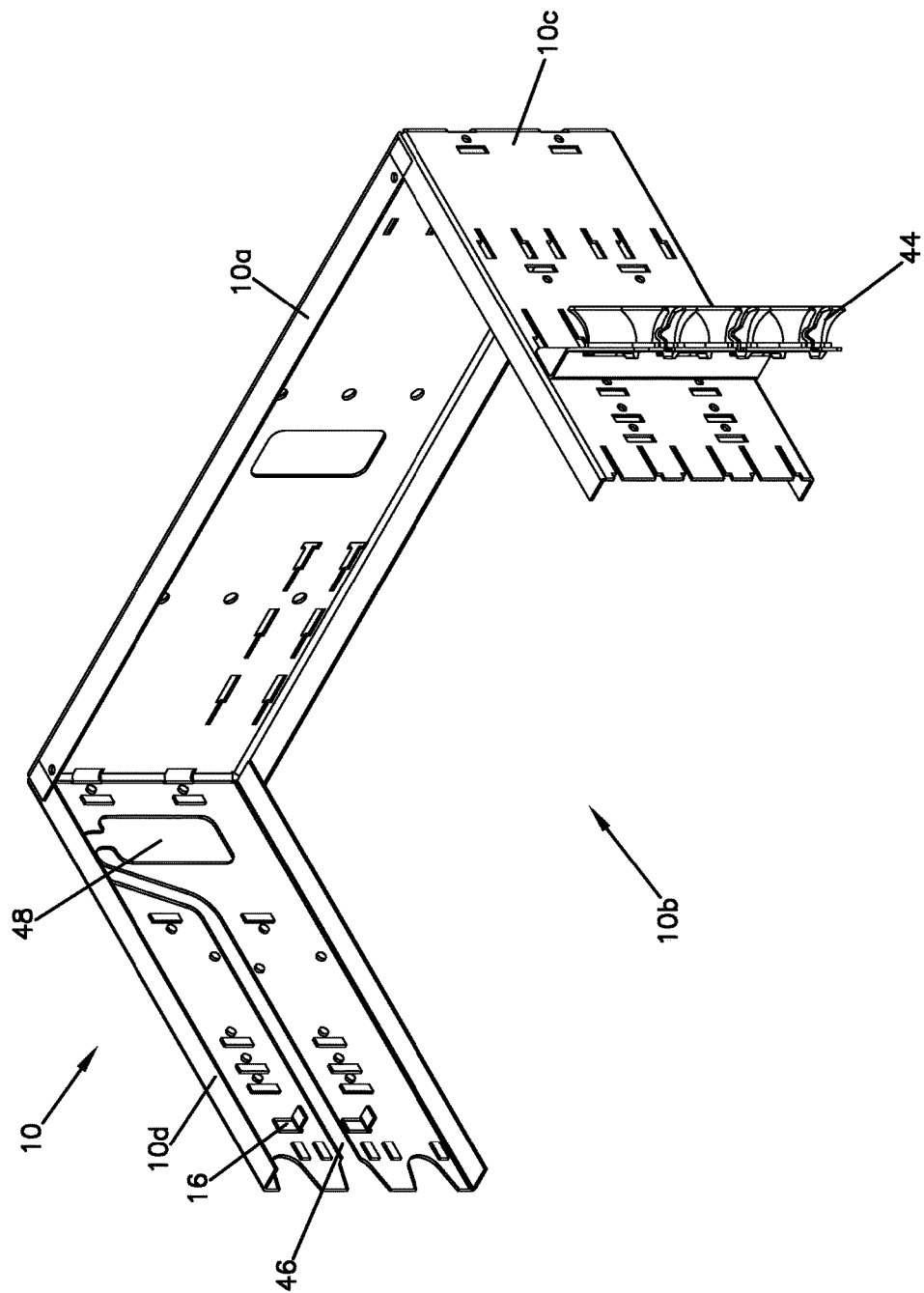
FIG. 5 is a perspective view of one of the multi-positionable tray assemblies of FIG. 1.
Figure 6:
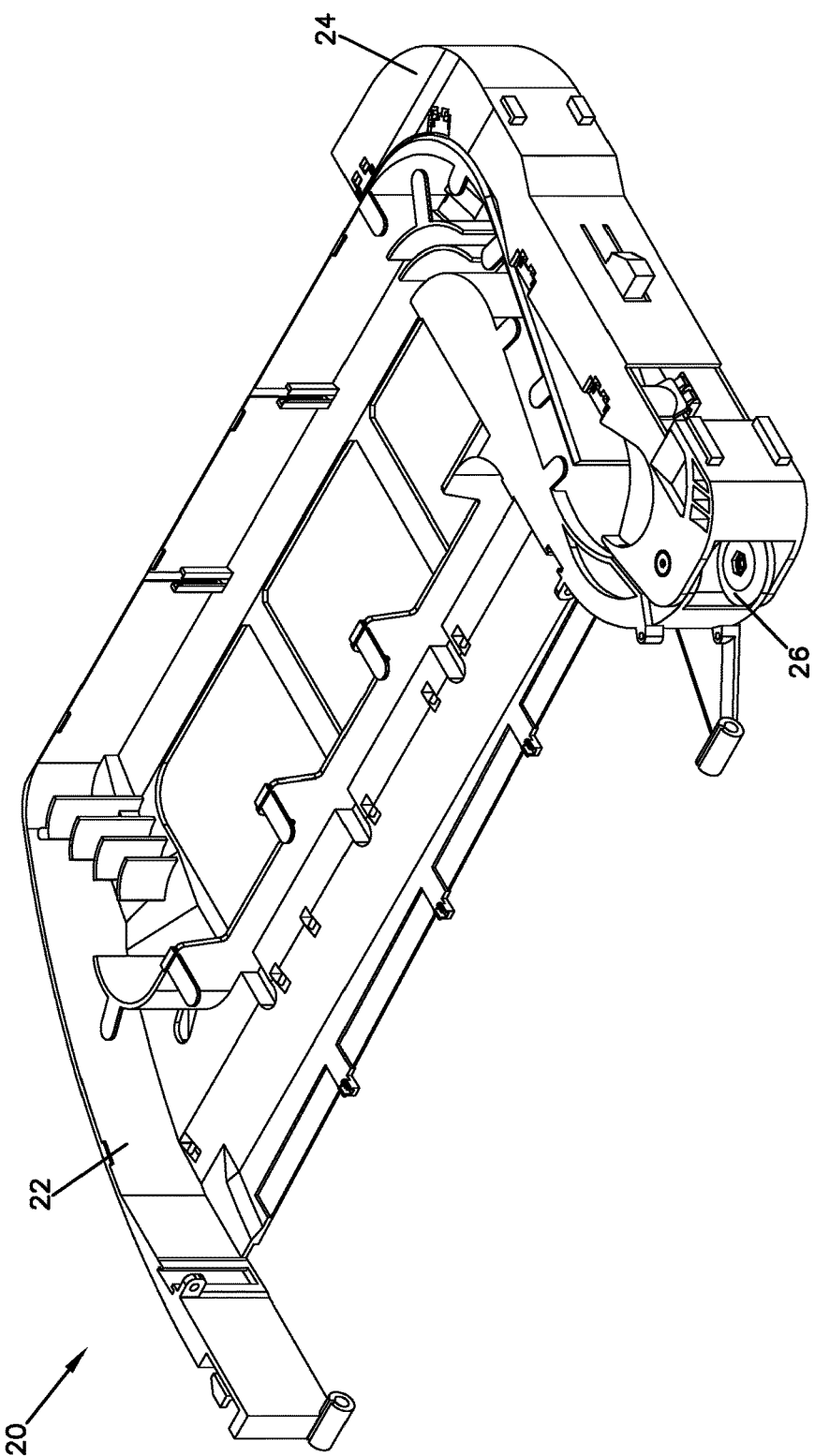
FIG. 6 is a perspective view of the multi-positionable trays of FIG. 6 with the various cable management structures removed from the tray.
Figure 7:
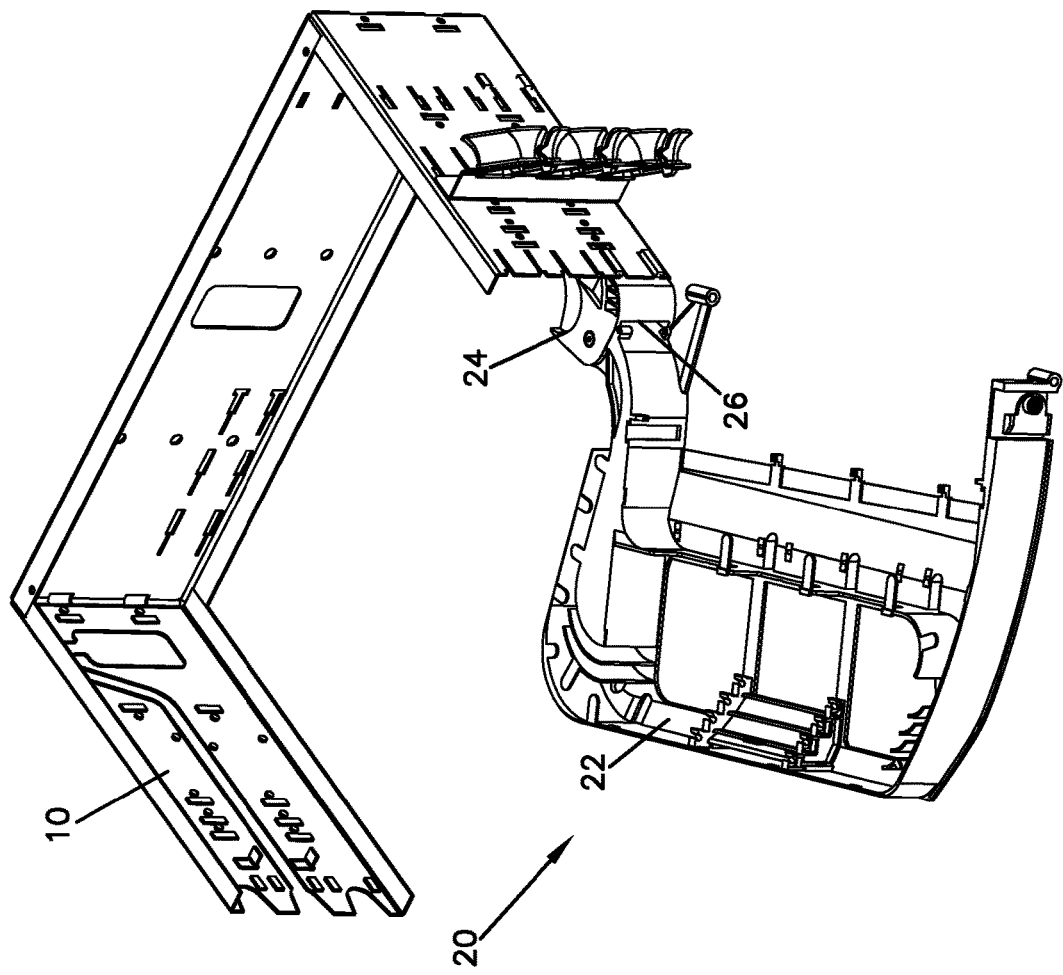
FIG. 7 is a perspective view of the multi-positionable tray assembly of FIG. 6 mounted to the chassis in an installed position and rotated into an access position.

As most easily seen at FIG. 4, the chassis 10 includes a rear side 10a extending between a first side 10c and a second side 10d. The chassis 10 also includes an open front side 10b for slidably receiving the tray assembly 20. The chassis may include a number of features to facilitate the mounting of the tray assembly 20 to the chassis 10 from a removed position 206 to an installed position 204. For example, the chassis 10 may be provided with a plurality of attachment slots 12 at the first and second sides 10c, 10d that are configured to engage with corresponding attachment guide members 40 located on the support arm 24. In the embodiment shown, the attachment slots 12 and the guide members 40 extend in a direction D1 that is parallel to the first and second sides 10c, 10d of the chassis 10. This configuration allows the guide members 40 to engage with the attachment slots 12 when the tray assembly 20 is inserted into the chassis 10 into an installed position 204. In one example, the guide members 40 have a T-shape cross-section to more securely engage the attachment slots 12 by preventing rotation of the support arm 24 with respect to the side 10c or 10d of the chassis 10 to which the support arm 24 is attached.

The chassis 10 can also be provided with features to secure the tray assembly 20 within the chassis 10 so that the tray assembly 20 is retained in the installed position 204. For example, the chassis 10 can be provided with a first latch recess 14 configured to receive a first latch member 36 of the tray assembly 20. In the embodiment shown, the support arm 24 is provided with a depressible first latch member 36 that initially deflects as the tray assembly 20 is being pushed into the installed position 204 and then snaps into the latch recess 14 once the tray assembly 20 is fully installed to form a snap-fit type of connection. The tray assembly 20 can be released from the chassis 10 by depressing the latch member 36 and pulling the tray assembly out of the chassis 10.

The chassis 10 can also be provided with features to secure the tray 22 of the tray assembly 20 to the chassis 10 so that the tray assembly 20 is retained in the folded position 200. For example, the chassis 10 can be provided with a second latch recess 14 configured to receive a second latch member 38 of the tray assembly 20. In the embodiment shown, the support arm 24 is provided with a second depressible latch member 38 that initially deflects as the tray assembly 20 is being rotated into the folded position 200 and then snaps into the latch recess 38 once the tray assembly 20 is fully rotated to form a snap-fit type of connection. The tray 22 can be released from the chassis 10 by depressing the latch member 38 and rotating the tray 22 away from the chassis 10 towards the access position 202.

The chassis 10 can also be configured to support other components of the telecommunications panel 100, as desired. For example, the chassis 10 can be configured to support cable management features 44 and 54. In the embodiment shown, cable management features 54 and 44 guide patch cords 304 extending from the tray assembly 20. The chassis 10 may also be provided with one or more features for allowing cable to enter the chassis 10, for example cable routing slot 46 and cable routing aperture 48.

In addition to the previously described aspects of the support arm 24, the support arm 24 further includes a first end 24a and a second end 24b having an exterior side 24d, a top wall 24e, and a bottom wall 24f. In the embodiment presented, the walls 24e, 24f and the side 24d together form a channel-like structure having an open interior side 24c within which a portion of a cable pathway 208 is formed. Adjacent the first end 24a are the upper and lower joint arms 28, 30 that form a part of the pivot joint 26. In one aspect, the support arm 24 is provided with a plurality of cable guides 42 to ensure that cables 300 routed within the support arm 24 are adequately retained.

In addition to the previously described aspects of the tray 22, the tray 22 further includes a rear side 22a and a front side 22b that extend between opposite first and seconds sides 22c, 22d. The tray 22 may also be provided with a cover 23 for protecting the components and fiber supported within the tray 22. In one aspect, the tray 22 includes a pair of hinges 52 for rotatably supporting an access door or cover. The location of the door and hinges 52 can define a front plane A4 of the tray 22 which is shown as being parallel to the rear side 22a and orthogonal to the first and second sides 22c, 22d.

The tray 22 further defines the cable routing pathway 208 via the walls forming the first side 22c and the rear side 22a of the tray 22, along with a bottom portion 22h of the tray 22. An interior wall structure 22e also functions to define the cable routing pathway 208, as do radius guides 22f which prevent the cables 300 from kinking or bending too severely. The cables 300 can be further retained within the cable routing pathway 208 via a plurality of cable guides 22g located at the top of the tray 22.

Figure 17:
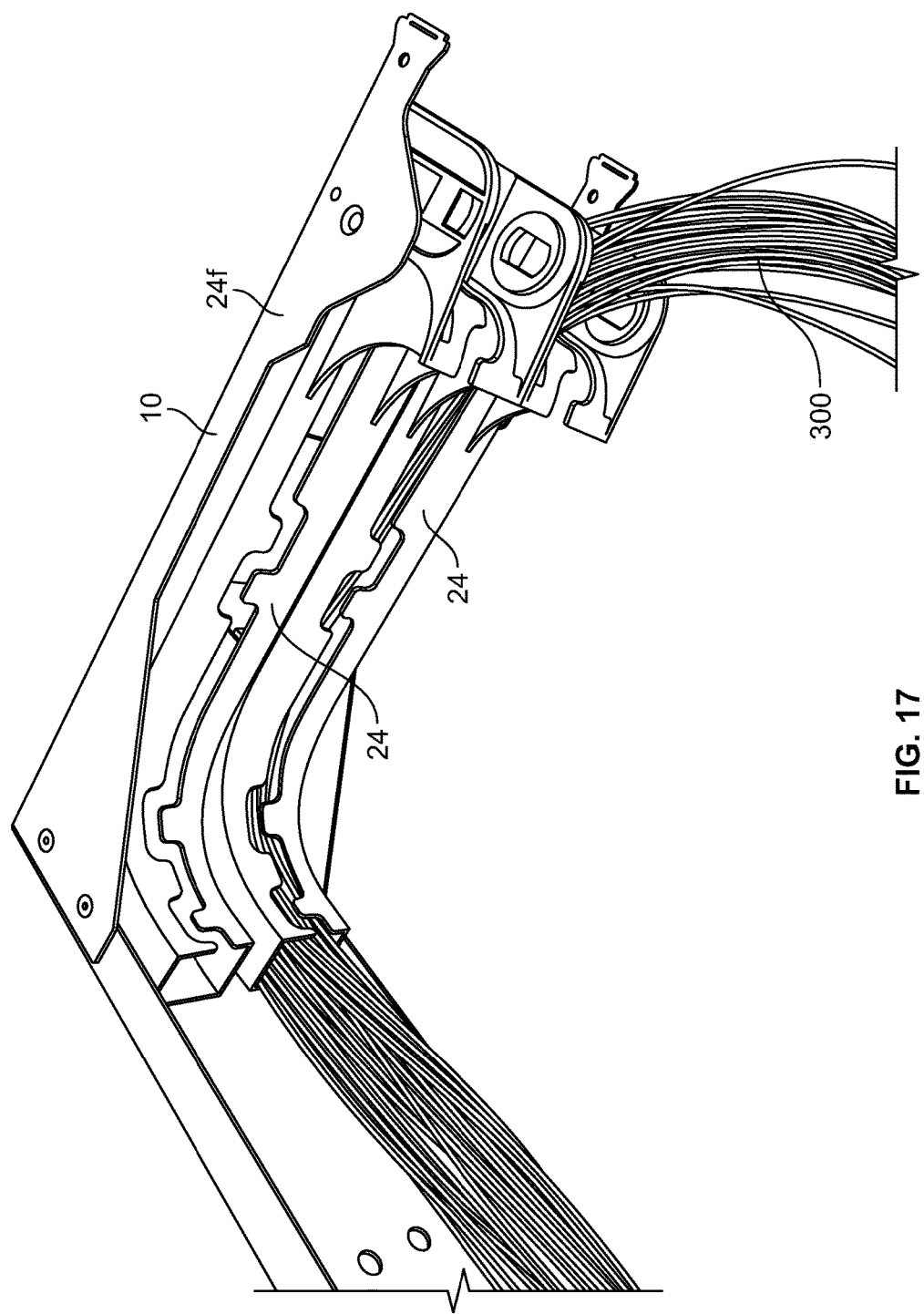
FIG. 17 is a perspective photographic view of a support arm of FIG. 12 with cables routed within a cable routing path defined by the support arm.
Figure 18:
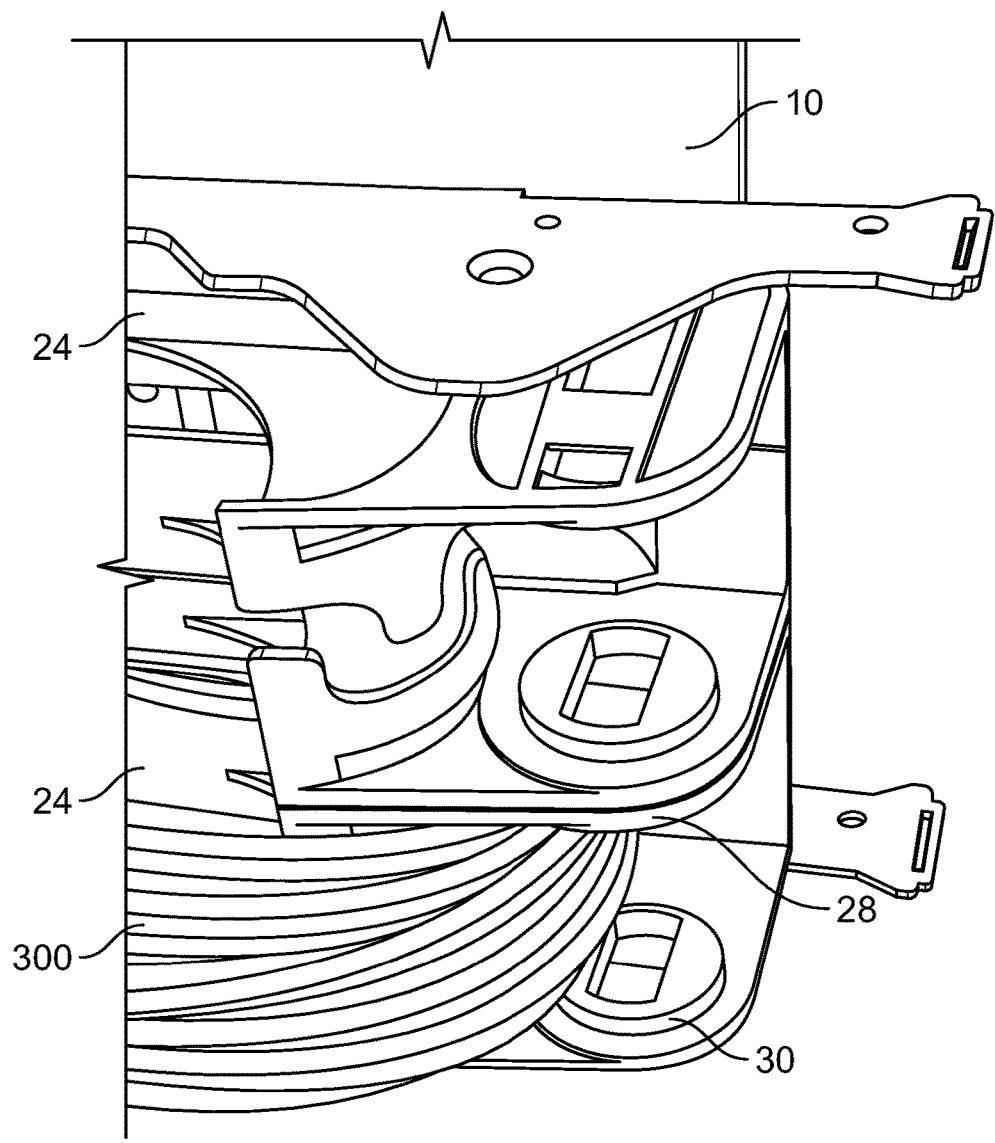
FIG. 18 is a perspective photographic view of a support arm of FIG. 12 with cables of FIG. 17 wrapped around the first end of the support arm about the pivot joint.
Figure 19:
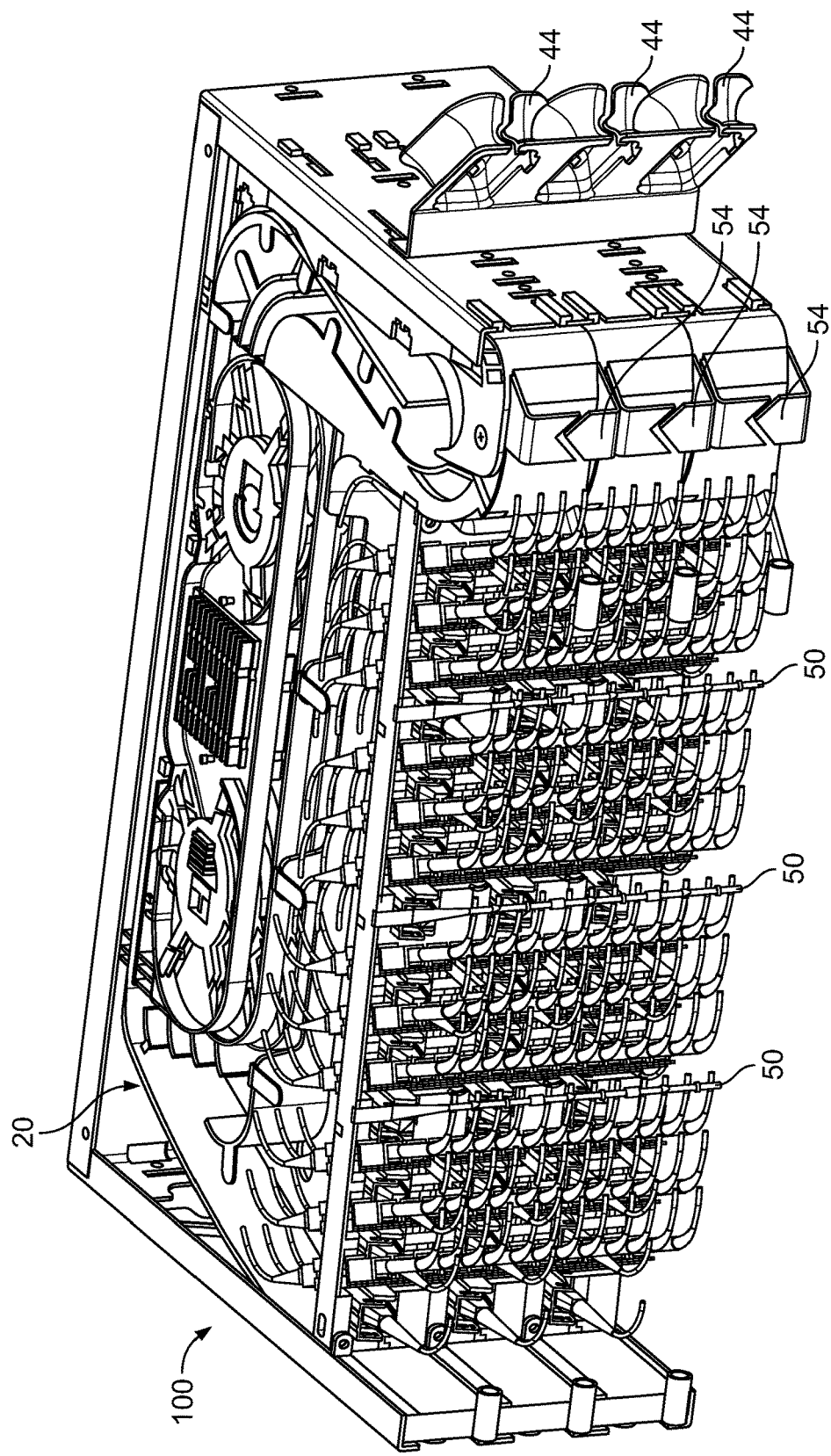
FIG. 19 is a perspective view of the telecommunications panel of FIG. 1, with additional cable mounting features mounted thereon.

As discussed previously, the cable routing pathway 208 passes between the space defined between the upper and lower joint extensions 32, 34 of the tray 22. Because the upper joint extension 32 engages with the upper joint arm 28 and the lower joint extension 34 engages with the lower joint arm 30, the pivot joint 26 is formed without the need for any structure between the upper and lower joint extensions 32, 34. Accordingly, this space can be utilized to define the cable routing pathway 208 as it extends from the support arm 24 and the tray 22. The upper and lower joint extensions 32, 34 also serve to constrain the cables 300 as the cables traverse between the support arm 24 and the tray 22. Accordingly, the cables 300 within the cable routing pathway 208 enter the tray 22 through the pivot joint 26 in an orientation that is perpendicular to the rotation axis A1. FIGS. 17 and 18 show an example of a number of cables 300 passing through the pivot joint 26. A key benefit to allowing the cables 300 to be routed through the pivot joint 26 rotational axis A1 is that the routing length of the cables 300 can remain relatively unchanged as the tray 22 is rotated between the folded and access positions 200, 202. Thus, the rotation of the tray 22 does not cause undue tension on the cables 300 as the tray 22 is being rotated about the pivot axis A1.

Figure 8:
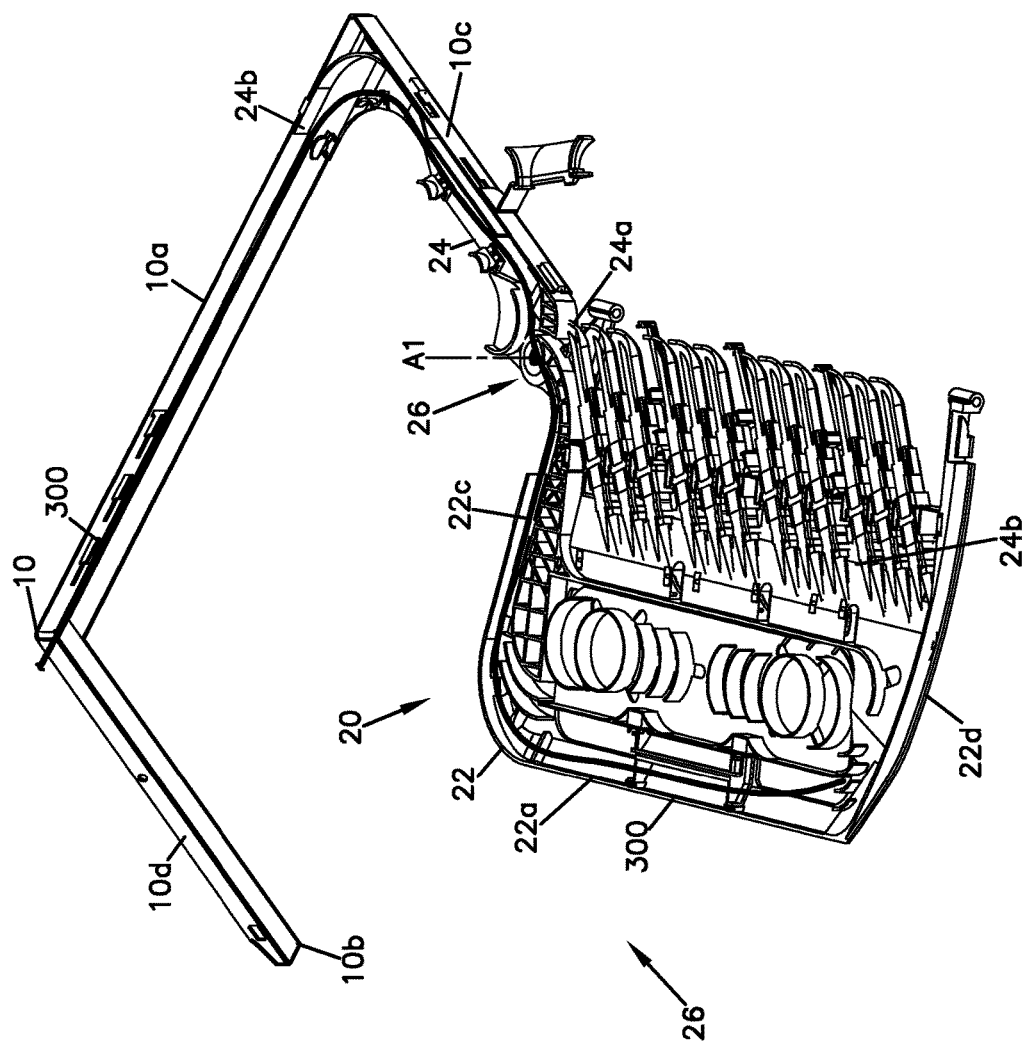
FIG. 8 is a cross-sectional perspective view of one of the multi-positionable tray assemblies of FIG. 1 shown in an installed position and rotated into an access position.
Figure 9:
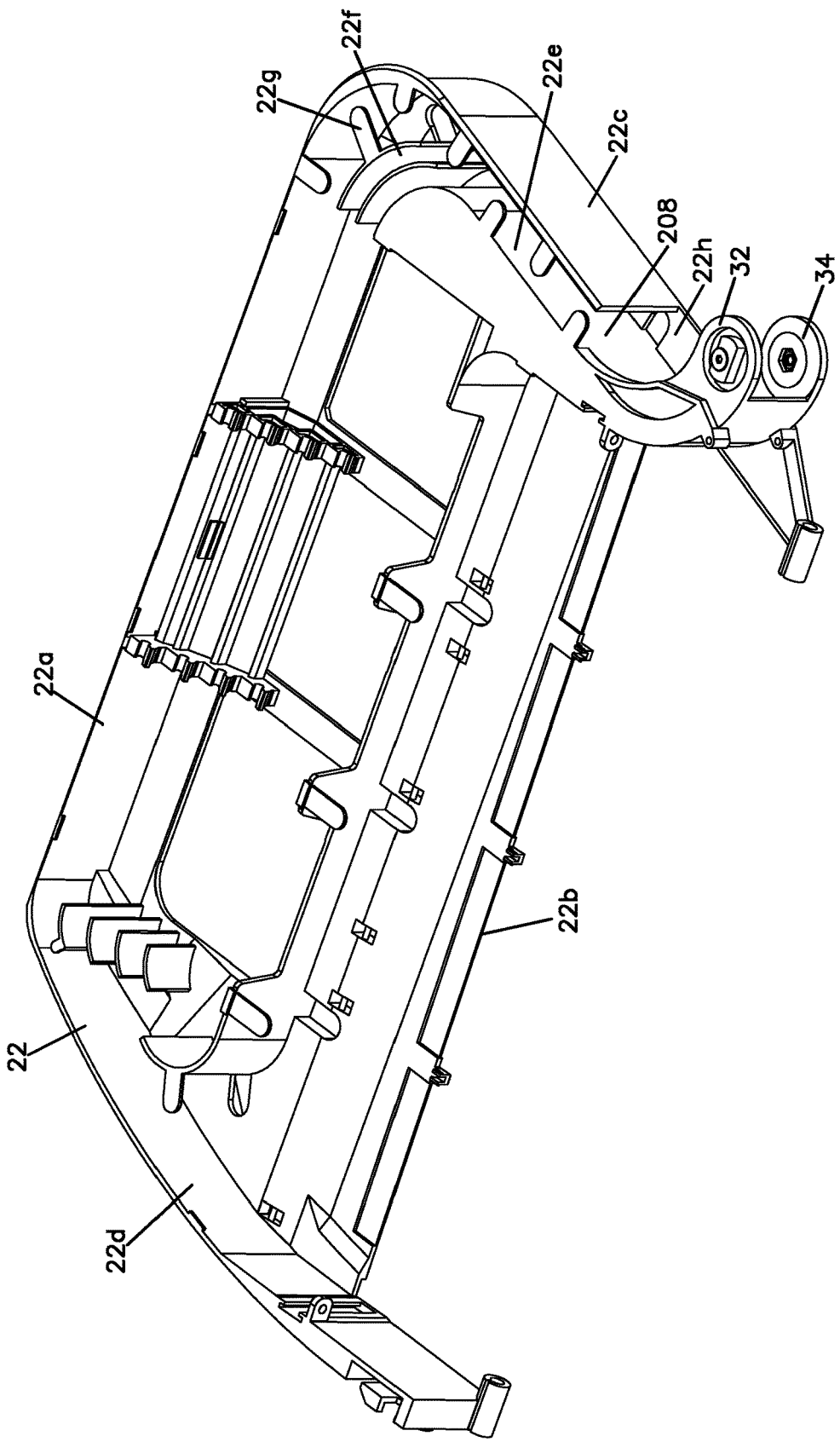
FIG. 9 is a perspective view of a tray of one of the multi-positionable tray assemblies of FIG. 1.
Figure 10:
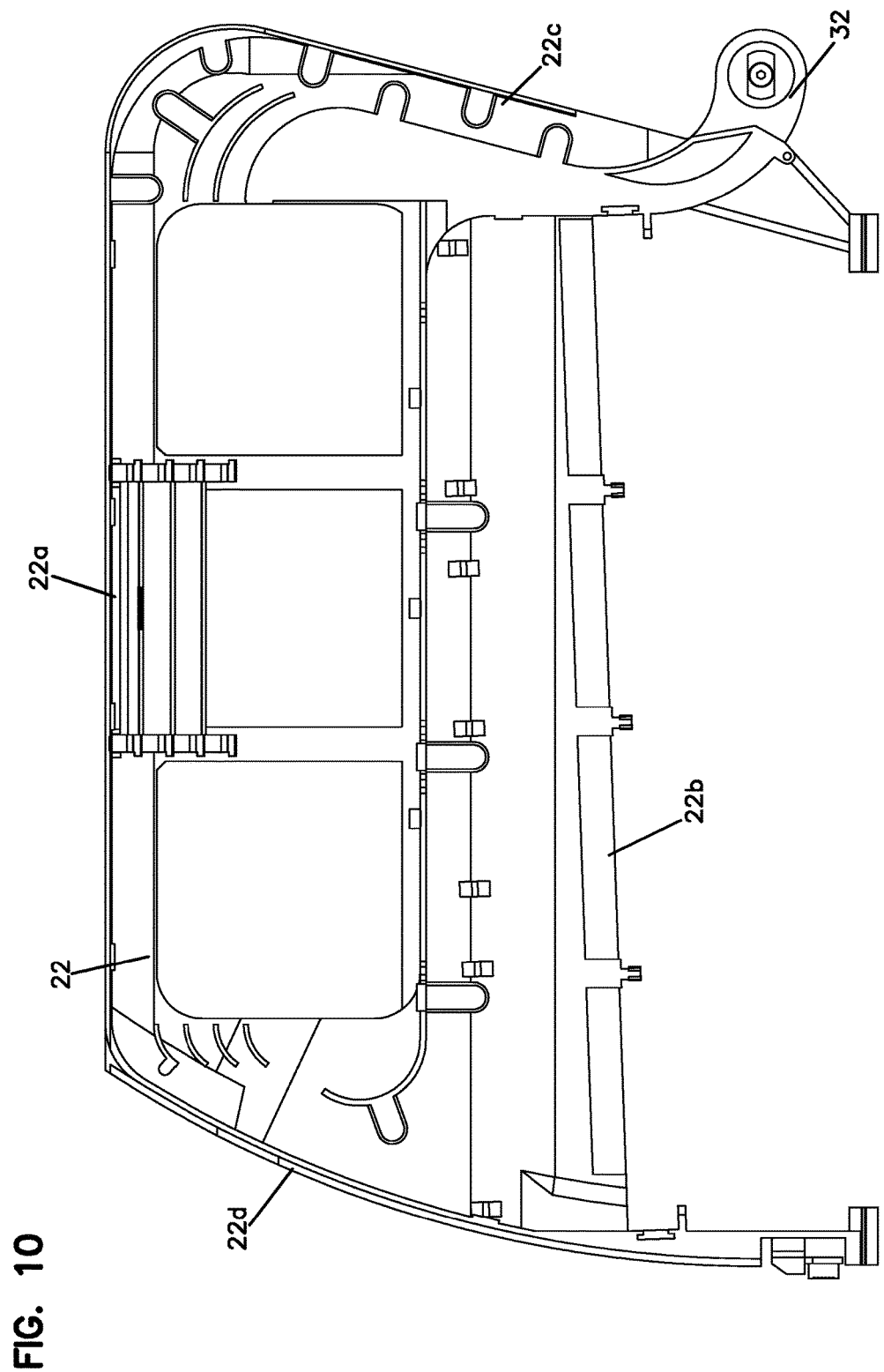
FIG. 10 is a top view of the tray of FIG. 9.
Figure 11:
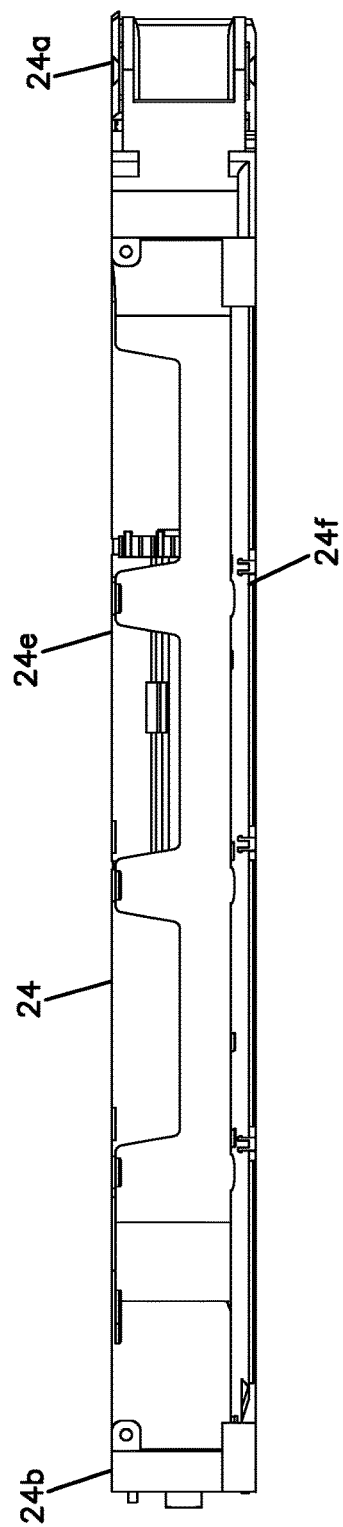
FIG. 11 is a front view of the tray of FIG. 10'.
Figure 12:
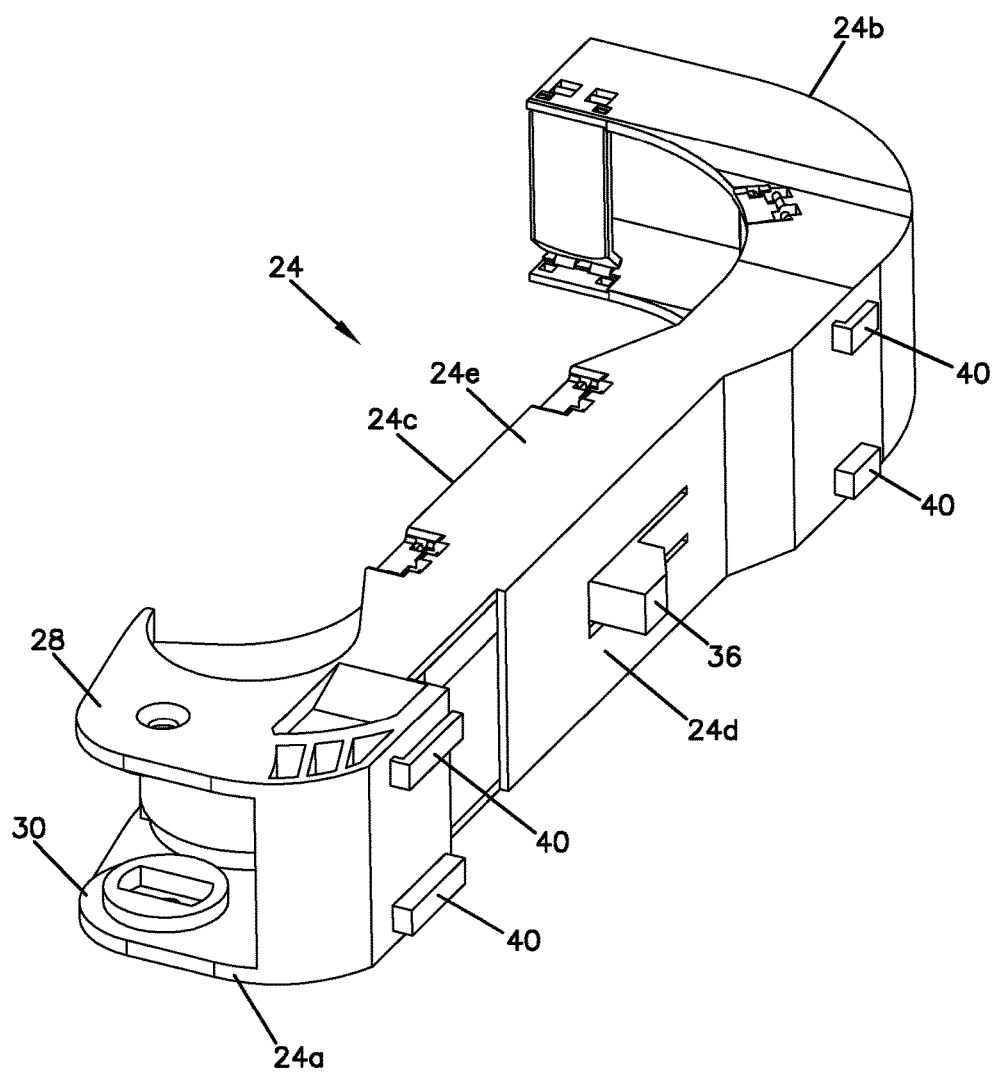
FIG. 12 is a front-right perspective view of a support arm of one of the multi-positionable trays of FIG. 1.
Figure 13:
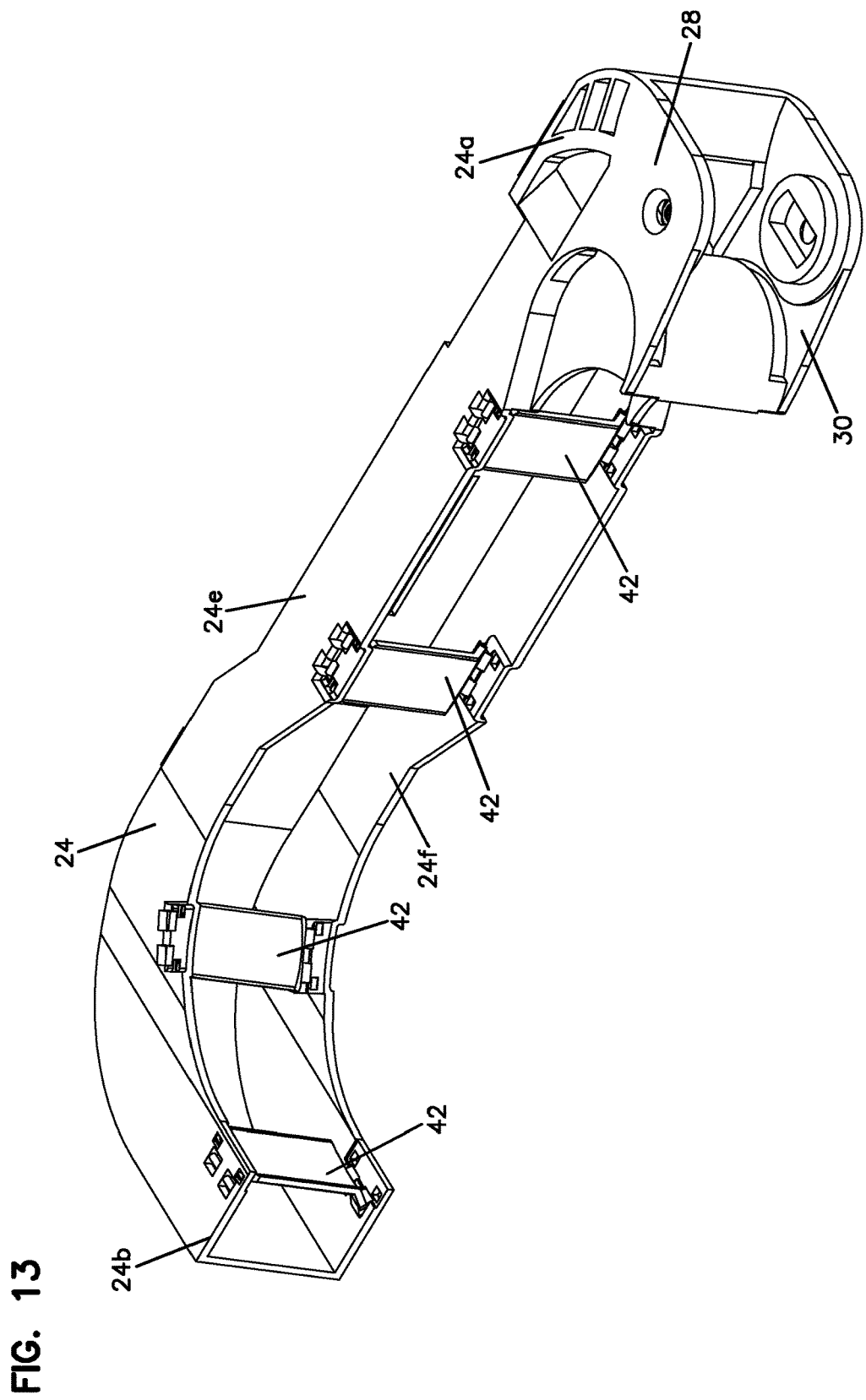
FIG. 13 is a front-left perspective view of the support arm of FIG. 12.
Figure 14:
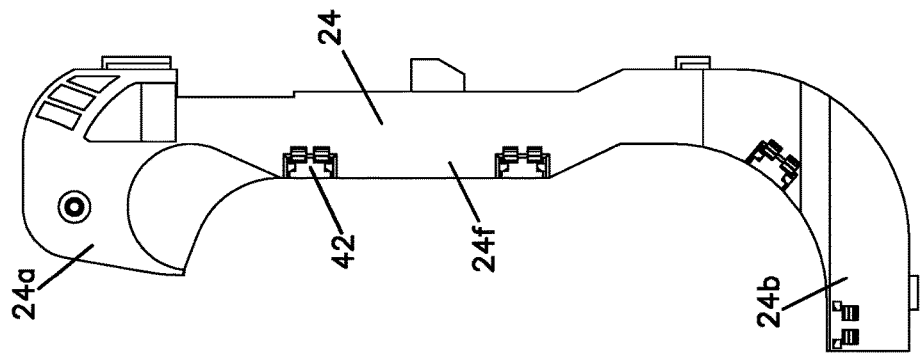
FIG. 14 is a top view of the support arm of FIG. 12.
Figure 15:
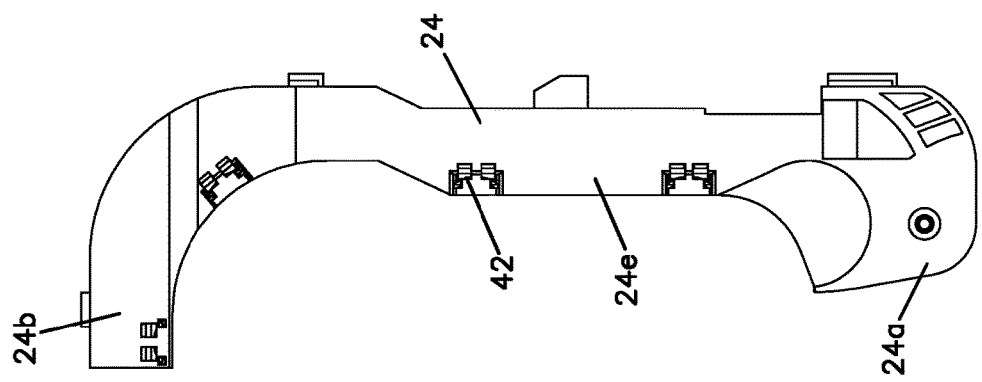
FIG. 15 is a bottom view of the support arm of FIG. 12.
Figure 16:
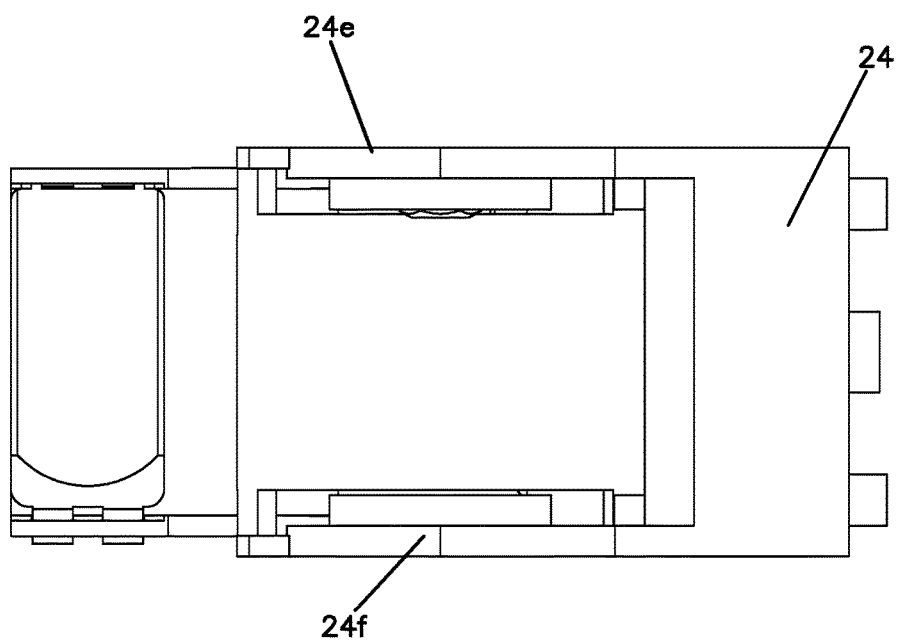
FIG. 16 is an end view of the support arm of FIG. 12.

Referring to FIG. 8, it can be seen that above described configuration results in the cable routing pathway 208 extending from the second end 24b of the support arm 24 to the first end 24a of the support arm 24, across the pivot joint 26, and along the first side 22c and rear side 22a of the tray 22. The cables 300 can further extend from the second end 24b of the support arm along the rear side 10a of the chassis 10 towards the second end 10d, and through the cable routing aperture 48.

In the embodiment presented, the tray 22 is configured to hold a plurality of splice trays 112 or other components to which the cables 300 can be routed along the rear side 22a of the tray 22. In the embodiment shown, the cables 300 extend to the splice trays 112 from which patch cords 302 extend as cabled ends 110a of fiber optic connectors 110. The fiber optic connectors 110 are shown as being connected to the first sides 108a of adapters 108. As shown, the adapters 108 are arranged along a transverse axis A2 which generally extends between the sides 22c and 22d of the tray 22. In one embodiment, the adapters 108 in the patch panel 104 are supported by a patch panel frame 106 extending along transverse axis A2 from a first end 106a proximate first side 22c to a second end 106b proximate second side 22d. Fiber optic connectors 114 are shown as being connected to the second sides 108b of the adapters 108. The fiber optic connectors 114 are shown as having cabled ends 114a which form patch cords 304 which can be routed through cable management features 44 and 50 to the outside of the telecommunications panel 100.

As shown, the adapters 108 and connectors 110, 114 are aligned along an axis A3 which is shown as forming an oblique angle with the transverse axis A2. This configuration is advantageous over configurations in which the axes A2 and A3 are generally orthogonal in that less overall depth (i.e. the distance between the rear side 22a and the front side 22b) is required of the tray 22 in order to accommodate the cable management structures. Additionally, by disposing the cabled ends 114a of the connectors 114 at an angle towards the end of the telecommunications panel 100 at which the patch cords 304 exit via cable management feature 44, less turning is required of the cords and thus bend radius protection is enhanced. Likewise, by disposing the cabled ends 110a of the connectors 110 at an angle towards the splice trays 112, less turning is required of the cords and thus bend radius protection is enhanced in this manner as well. Space allocation can be further enhanced by arranging the patch panel frame 106 such that axis A3 is not parallel to the front plane A4 or rear side 22a. For example, the patch panel 104 and frame 106 can be oriented such that axis A3 is at an angle from about 2 to about 4 degrees, and preferably about 2.5 degrees, with respect to the axis A4 and the rear side 22a of the panel 22. This configuration allows for there to be a greater distance D1 provided between the patch panel 104 and the front face plane A4 of the tray 22 at the first side 22c, as compared to the corresponding distance D2 at the second side 22d of the tray 22. Likewise, this configuration also allows for there to be a greater distance D3 provided between the patch panel 104 and the splice tray 112 of the tray 22 at the second side 22d, as compared to the corresponding distance D4 at the first side 22c of the tray 22. As the patch cords 302 are greater towards the second end 22d of the tray 22 and the patch cords 304 are greater in number towards the first end 22c of the tray 22, the increased distances D1 and D3, respectively, provide for additional cable routing space where it is most needed and allows for a more compact construction of the tray 22.

It is noted that the drawings show a configuration in which the support arm 24 and pivot joint 26 are proximate the first side 22c of the tray 22. This configuration results in the tray 22 being pivotable from the first side 22c of the tray 22. However, the support arm 24 and tray 22 can be produced as mirror images of the embodiment shown in the drawings, such that the support arm 24 and pivot joint 26 are located proximate the second side 22d of the tray 22 which would allow for the tray 22 to be rotated about the second side 22d of the tray 22.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

LIST OF REFERENCE NUMERALS AND CORRESPONDING FEATURES

A1 pivot axis
A2 transverse axis
A3 longitudinal connection axis
A4 front face plane
D1 first distance
D2 second distance
D3 third distance
D4 fourth distance
1 telecommunications cabinet
10 chassis
10a rear side
10b front side
10c first side
10d second side
12 attachment slots
14 first latch recess
16 second latch recess
20 multi-positionable tray assembly
22 tray
23 tray cover
22a rear side
22b front side
22c first side
22d second side
22e interior wall structure
22f radius guides 22g cable guides
23 tray cover
24 support arm
24a first end
24b second end
24c open interior side
24d exterior side
24e top wall
24f bottom wall
26 pivot joint
28 upper joint arm
30 lower joint arm
32 upper joint extension
34 lower joint extension
36 first latch member
38 second latch member
40 attachment guide members
42 support arm cable guides
44 cable management feature
46 cable routing slot
48 cable routing aperture
50 cable management feature
52 cover hinges
54 cable management feature
100 telecommunications panel
102 cable management structure
104 patch panel
106 patch panel frame
106a first end
106b second end
108 fiber optic adapters
108a first side
108b second side
110 first fiber optic connectors
110a cabled end
112 splice tray
114 second fiber optic connectors
114a cabled end
200 folded position
202 access position
204 installed position
206 removed position
208 cable routing pathway
300 cables
302 patch cord
304 patch cord

What is claimed is:

1. A multi-positionable tray assembly for mounting within a chassis of a telecommunications panel, the multi-positionable tray assembly comprising:
  a. a tray configured to support at least one cable management structure, the tray including an upper joint extension and a lower joint extension through which the pivot axis extends; and
  b. a support arm connected to and supporting the tray at a pivot joint such that the tray is rotatable about the pivot joint at a pivot axis between a folded position and an access position, the support arm including an upper joint arm and a lower joint arm through which the pivot axis extends, wherein the upper joint arm rotatably engages with the upper joint extension with a snap-fit connection and the lower joint arm rotatably engages with the lower joint extension with a snap-fit connection;
  c. wherein, the tray and the support arm cooperatively define a cable routing pathway that extends through the pivot axis of the pivot joint defined by the tray and the support arm and extends between the upper joint arm and the lower joint arm and between the upper joint extension and lower joint extension.

2. The multi-positionable tray assembly of claim 1, wherein:
  a. the tray defines a rear side and a front side extending between opposite first and second sides;
  b. the support arm defines a first end and a second end, the upper and lower joint arms being located at the first end; and
  c. the cable routing pathway extends from the support arm second end to the pivot joint and from the pivot joint to the tray rear side along the tray first side.

3. The multi-positionable tray assembly of claim 2, wherein:
  a. the cable routing pathway further extends from the tray first side towards the tray second side along the tray rear side.

4. The multi-positionable tray assembly of claim 3, further comprising:
  a. a plurality of cable guides extending from a top wall of the support arm to a bottom wall of the support arm.

5. The multi-positionable tray assembly of claim 4, further comprising:
  a. a plurality of cable guides extending from at least one of the first side of the tray and the interior wall of the tray.

6. A telecommunications panel comprising:
  a. a chassis having a rear side extending between first and second sides to define an open front side; and
  b. a plurality of multi-positionable tray assemblies, each of the tray assemblies including:
    (i) a tray configured to support at least one cable management structure, the tray including an upper joint extension and a lower joint extension through which the pivot axis extends; and
    (ii) a support arm connected to and supporting the tray at a pivot joint such that the tray is rotatable about the pivot joint at a pivot axis between a folded position and an access position, the support arm including an upper joint arm and a lower joint arm through which the pivot axis extends, wherein the upper joint arm rotatably engages with the upper joint extension with a snap-fit connection and the lower joint arm rotatably engages with the lower joint extension with a snap-fit connection;
    (iii) wherein, the tray and the support arm cooperatively define a cable routing pathway that extends through the pivot axis of the pivot joint defined by the tray and the support arm and extends between the upper joint arm and the lower joint arm and between the upper joint extension and lower joint extension,
    (iv) wherein the cable routing pathway extends from a rear end to a front end of the support arm, through the pivot axis, and from a front side of the tray to a rear side of the tray along an outermost portion of a first side of the tray most proximate the support arm.

7. The telecommunications panel of claim 6, wherein:
  a. the cable routing pathway further extends from the tray first side towards the tray second side along the tray rear side.

8. The telecommunications panel of claim 7, further comprising:
  a. a plurality of cable guides extending from a top wall of the support arm to a bottom wall of the support arm.

9. The telecommunications panel of claim 8, further comprising:

a. a plurality of cable guides extending from at least one of the first side of the tray and the interior wall of the tray.

10. The telecommunications panel of claim 6, wherein the plurality of multi-positionable tray assemblies includes three multi-positionable tray assemblies.

11. The telecommunications panel of claim 6, wherein the cable management structure includes at least one splice tray and a patch panel.

\* \* \* \* \*